United States Patent [19]

Pretty

[11] Patent Number: 4,687,391
[45] Date of Patent: Aug. 18, 1987

[54] MILLING MACHINE HEAD ASSEMBLY

[76] Inventor: Arthur J. Pretty, 500 Cagney La., #115, Newport Beach, Calif. 92663

[21] Appl. No.: 714,938

[22] Filed: Mar. 22, 1985

[30] Foreign Application Priority Data

Apr. 19, 1984 [GB] United Kingdom ............... 8410257

[51] Int. Cl.$^4$ .............................................. B23Q 1/12
[52] U.S. Cl. .................................... 409/201; 409/211; 409/230
[58] Field of Search ............. 409/201, 209, 211, 216, 409/230, 231, 146, 200, 204, 215, 224, 228, 229, 235, 236; 474/112, 119, 123, 133, 134; 74/63, 190, 665 G, 689, 701

[56] References Cited

U.S. PATENT DOCUMENTS

| | | | |
|---|---|---|---|
| 454,422 | 6/1891 | Brown | 474/134 X |
| 910,315 | 1/1909 | Riddell | 409/201 |
| 1,930,796 | 10/1933 | Garbutt et al. | 409/216 |
| 1,983,090 | 12/1934 | Kolsch | 409/211 X |
| 2,072,646 | 3/1937 | Ocenasek | 409/231 X |
| 2,078,859 | 4/1937 | Lapham | 409/216 |
| 2,304,779 | 12/1942 | Curtis | 409/211 |
| 2,361,171 | 10/1944 | Brauer | 409/216 |
| 2,392,035 | 1/1946 | Fett | 409/216 |
| 2,641,970 | 6/1953 | Plimmer | 409/209 X |
| 3,013,473 | 12/1961 | Straus | 409/211 X |
| 4,199,285 | 4/1980 | Bader et al. | 409/230 X |

Primary Examiner—Gil Weidenfeld
Assistant Examiner—Glenn L. Webb
Attorney, Agent, or Firm—Benoit Law Corporation

[57] ABSTRACT

A milling machine head assembly has a milling machine head mounted on a movable carriage, for movement with the carriage and for angular movement relative to the carriage about a predetermined axis. A motor is mounted on the carriage for movement with the carriage but is maintained stationary during angular movement of the machine head. Drive power is transmitted from the motor to the machine head in any angular position of the machine head within said angular movement. For this purpose, a power transmission is twistable relative to said predetermined axis and extends along said predetermined axis through the carriage from the motor to the machine head in the form of a twistable endless belt. The power transmission may include two parallel shafts comprising a spindle shaft for operating a tool bit, and an auxiliary shaft adapted to be driven off the motor by a first belt via one end of the auxiliary shaft. A belt and pulley transmission interconnects another end of the auxiliary shaft with the spindle shaft. The auxiliary shaft is mounted for pivotal movement between the ends thereof about a pivot axis located between the first belt and the belt and pulley transmission and extending at right angles to the auxiliary shaft to permit selective slackening and tightening of the belt and pulley transmission.

18 Claims, 7 Drawing Figures

MILLING MACHINE HEAD ASSEMBLY

BACKGROUND OF THE INVENTION

1. Field of the Invention

This invention relates to machine tools, and, more specifically, to milling machine head assemblies and to power transmissions which may have wider application than in the machine tool field.

2. Information Disclosure Statement

There are known, of course, heavy industrial milling machines comprising a milling head, which carries the tool bit or bits and which is provided with heavy drive motor, and in which the entire head is moveable vertically when the machine is in the normal upright mode of operation and is also rotatable about a horizontal axis. That kind of machine is also provided with a heavy duty worktable to which work pieces can be attached and which can be moved by feed screws in X and Y directions in a horizontal plane or in the plane to which the table is adjusted.

At the other end of the scale, there are light-weight milling machines such as are used by model makers in which the head also embodies the drive motor and is movable in a manner similar to that in the heavy machine, but because the machine is designed for machining of small, light parts, and may be used indoors on a table top worksurface, the machine must be kept as light as possible. Therefore, a very light, lower rated motor must be used, since that motor in prior-art machines moves with the head in operation. It has been found that in fact the available light weight machine is too fragile for the majority of operations which it has to perform.

SUMMARY OF THE INVENTION

It is a general object of the invention to overcome the disadvantages and to meet the needs expressed or implicit in the Information Disclosure Statement for in other parts hereof.

It is a germane object of this invention to provide an improved machine tool or milling machine head assembly usable by small component producers and in particular model enthusiasts who wish to machine their own model parts, and preferably usable in performing high finish operations on small components.

It is a related object of this invention to provide an improved machine tool head capable of performing the machining operations of millling, boring, drilling, and also adaptable to use in turning operations.

It is also an object of this invention to provide machine tool and machine head features usable in larger scale machines and in industrial applications.

Other objects of the invention will become apparent in the further course of this disclosure.

From a first aspect thereof, the subject invention resides in a milling machine head assembly, comprising, in combination, a milling machine head, means including a movable carriage for mounting that machine head for movement with the carriage, means for mounting the machine head on one side of the carriage for angular movement of the machine head relative to the carriage about a predetermined axis, the above mentioned means for mounting the machine head include a slide guide for slidably mounting the carriage, means for mounting that slide guide in an upright position, whereby the machine head and motor are vertically adjustable, and means for clamping the machine head in any adjusted position on the slide guide, means on an opposite side of the carriage for mounting a motor on that opposite side of the carriage for movement with that carriage independently of said angular movement of the machine head relative to said carriage, and means for transmitting drive power to the machine head in any angular position of the machine head within said angular movement, including a power transmission twistable relative to the motor and to said predetermined axis and extending along said predetermined axis through the carriage from the motor on said opposite side of the carriage to the machine head on said one side of the carriage. The power transmission includes an endless belt and means for mounting said endless belt in a loop extending through said carriage from said opposite side to said one side of the carriage along, and twistable relative to, said predetermined axis.

From a related second aspect thereof, the subject invention resides in a milling machine head assembly, comprising, in combination, two parallel shafts comprising a spindle shaft for operating a tool bit, and an auxiliary shaft adapted to be driven off a motor by a first belt via one end of the auxiliary shaft, a belt and pulley transmission interconnecting another end of the auxiliary shaft with the spindle shaft, a pivot axis located between the first belt and the belt and pulley transmission and extending at right angles to the auxiliary shaft, and means for mounting the auxiliary shaft for pivotal movement between the ends thereof about the pivot axis to permit selective slackening and tightening of the first belt and of belt means in the belt and pulley transmission.

Other aspects of the invention will become apparent in the further course of this disclosure, and no restriction whatever is intended by this brief summary of the invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
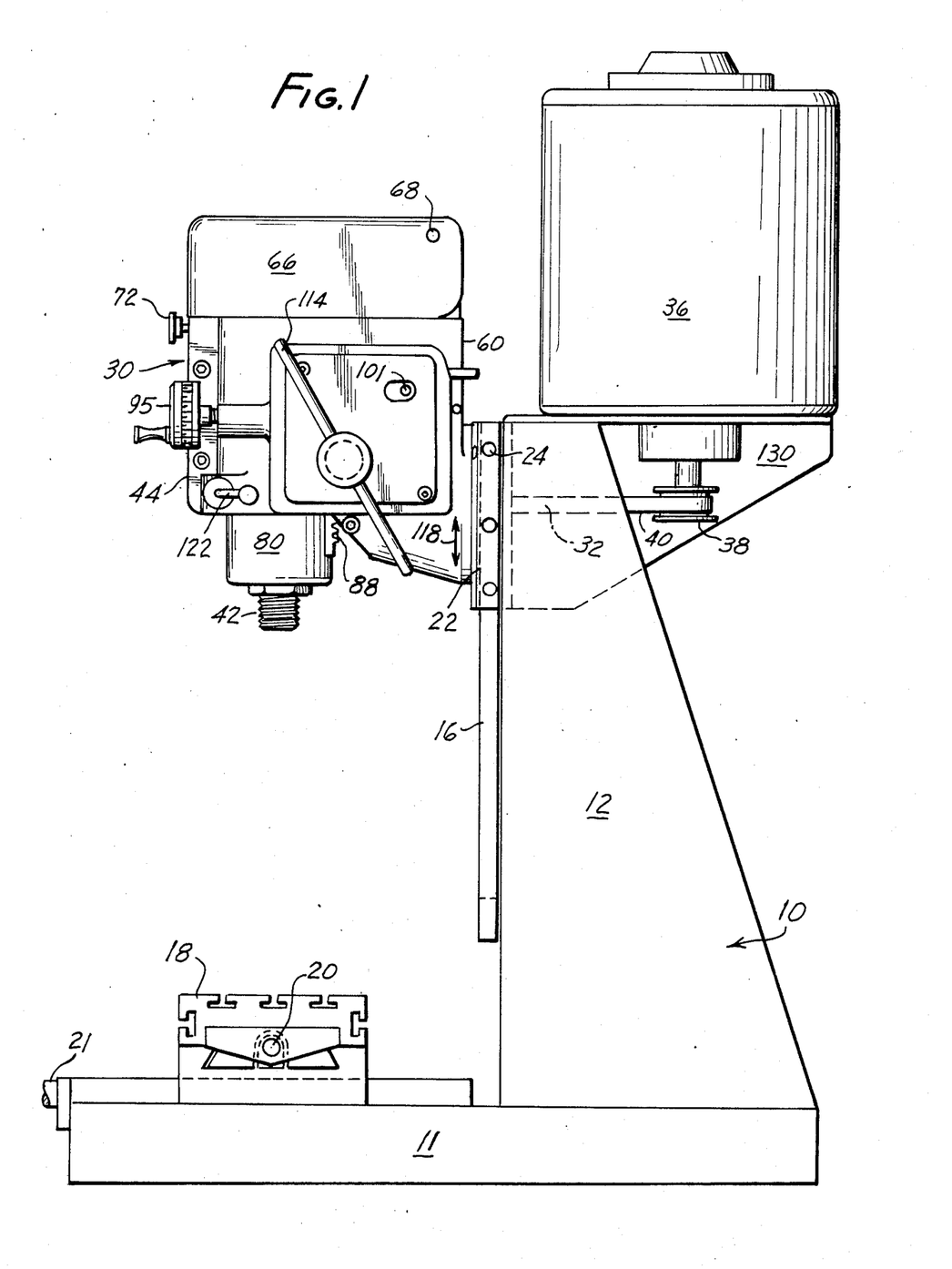
FIG. 1 is a side view of the milling machine, showing the head motor, according to a preferred embodiment of the subject invention.
Figure 2:
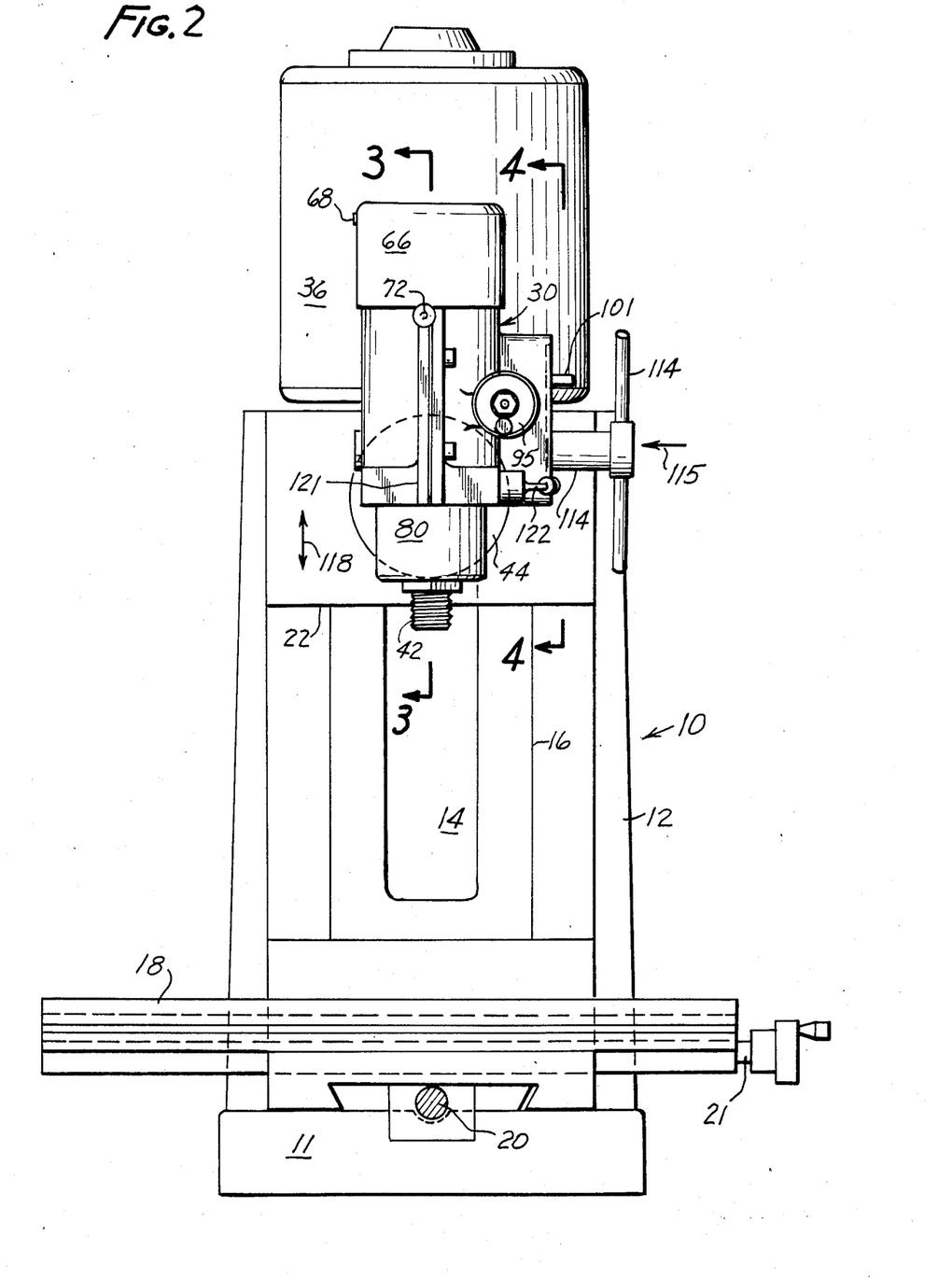
FIG. 2 is a front view of the arrangement shown in FIG. 1.

Referring to FIGS. 1 and 2, the illustrated machine 10 comprises a base 11 provided with a vertical stand 12. The stand has a slot 14 and a dovetail slideway 16. On the base 10 is a workpiece table 18 of conventional construction, whose position is controlled in X and Y directions by feed screws 20 and 21, again in a conventional manner.

Figure 3:
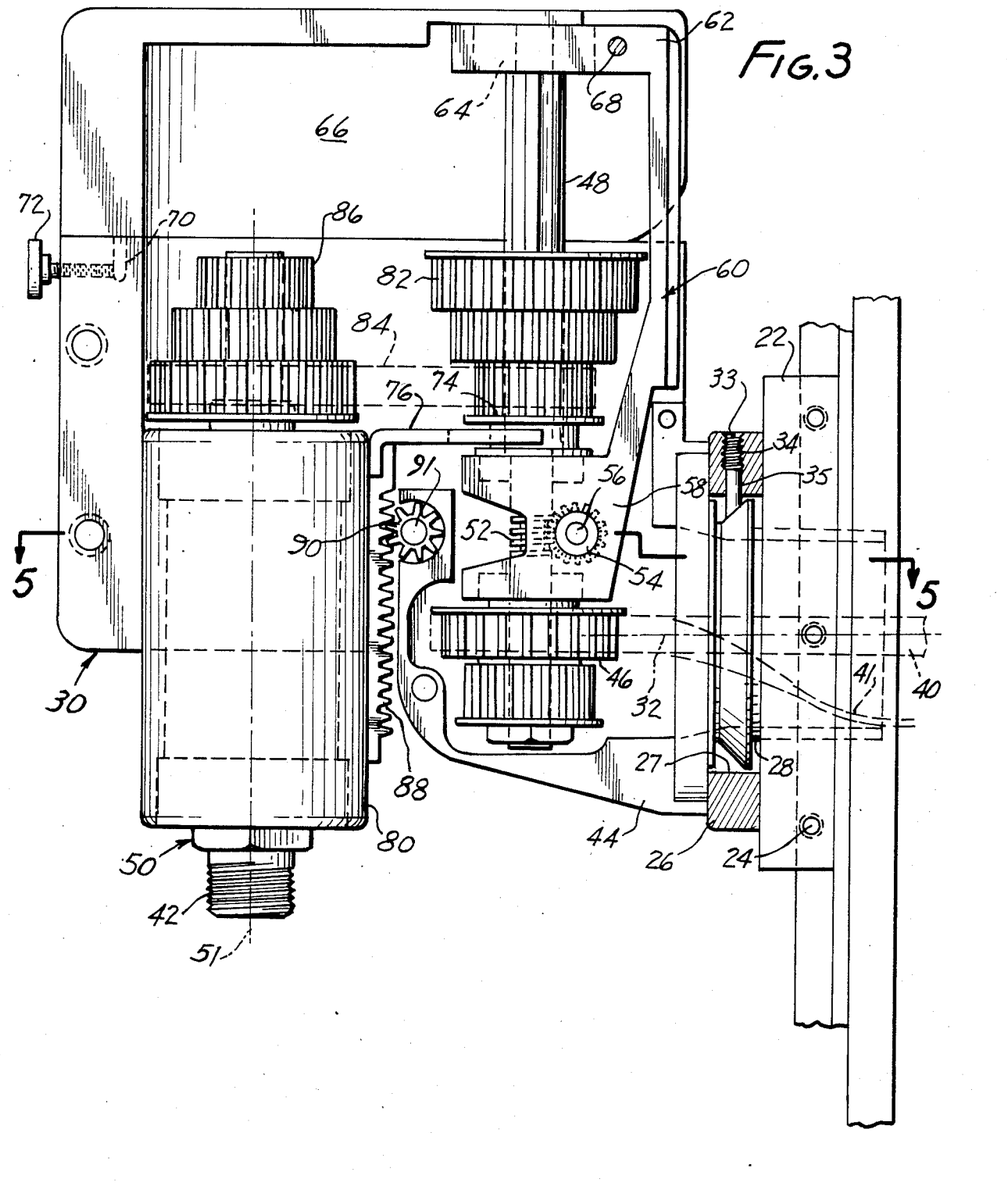
FIG. 3 is a sectional side view, on an enlarged scale, of the head according to a preferred embodiment of the subject invention, taken on the line 3—3 of FIG. 2.

Mounted on the slideway 16 is a vertical carriage 22 which has a dovetail slot that engages the dovetails of the slideway 16 so that the vertical carriage can move vertically on the guideway 16 at least in the disposition shown in FIG. 1. The vertical carriage 22 is adapted to be clamped in any adjusted position by screwing clamping screws into threaded bores 24 in vertical carriage 22. Small clamping plates may be provided between the clamping ends of the screws inserted in bores 24 to take out the play and to provide variable clamping. The vertical carriage 22 additionally is provided with a boss 26 which is annular and has a recess 27 as shown in FIG. 3, and received in the recess 27 for rotation therein is a tubular head mounting shaft 28 which is angled in section and which is part of a milling head 30, whereby the milling head can be rotated in the recess of boss 26 about an axis 32 which in the disposition of the machine shown in FIGS. 1 and 2, is horizontal. The tubular head mounting shaft 28 and hence the head 30 can be locked in any angularly adjusted position by locking screws 33 being screwed into threaded holes 34 in the boss 26, and causing the screws to act on wedge blocks 35 angled to the angling of the mounting shaft 28 and engaging such shaft.

FIGS. 1 and 2 show that a motor 36 is also carried by the vertical carriage 22, so that when the vertical carriage 22 is adjusted height-wise on the guideway 16 the motor 36 and head will be adjusted simultaneously. The drive from the motor 36 is through a motor pulley 38 and an endless timing belt 40. The drive from motor 36 is to drive a spindle 50 in the head 30 of which only an outer chuck mounting end 42 is illustrated in FIGS. 1 and 2.

Figure 6:
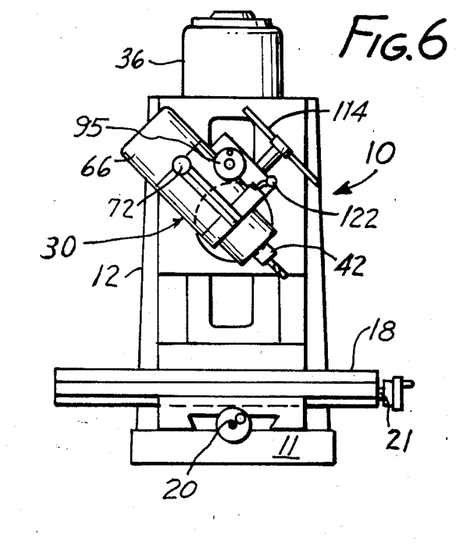
FIG. 6 is a view is similar to FIG. 2, on a reduced scale, illustrating angular mobility and adjustability of the head according to an embodiment of the subject invention.

The belt 40 lies on the rotational centre 32 of the head 30 in relation to the vertical carriage 22, so that the head can be angularly adjusted, within limits, as seen in FIG. 6. Angular adjustment by 90° at least to either side of the vertical is possible by virtue of the utilisation of a flexible timing belt 40 which simply twists as the angular adjustment is effected, as shown at 41.

Figure 4:
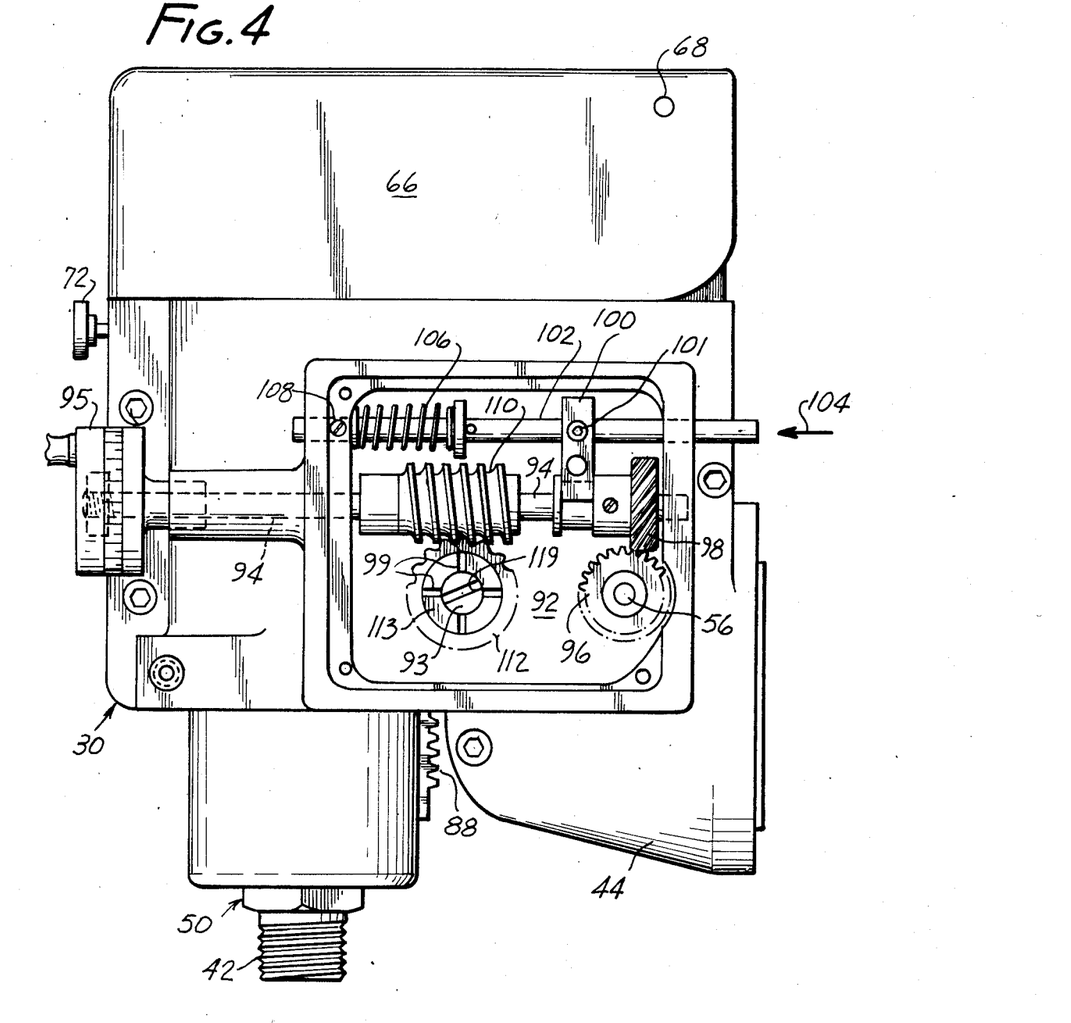
FIG. 4 is a side view, on an enlarged scale, taken on the line 4—4 in FIG. 2, with a gear box cover removed for better visibility.
Figure 5:
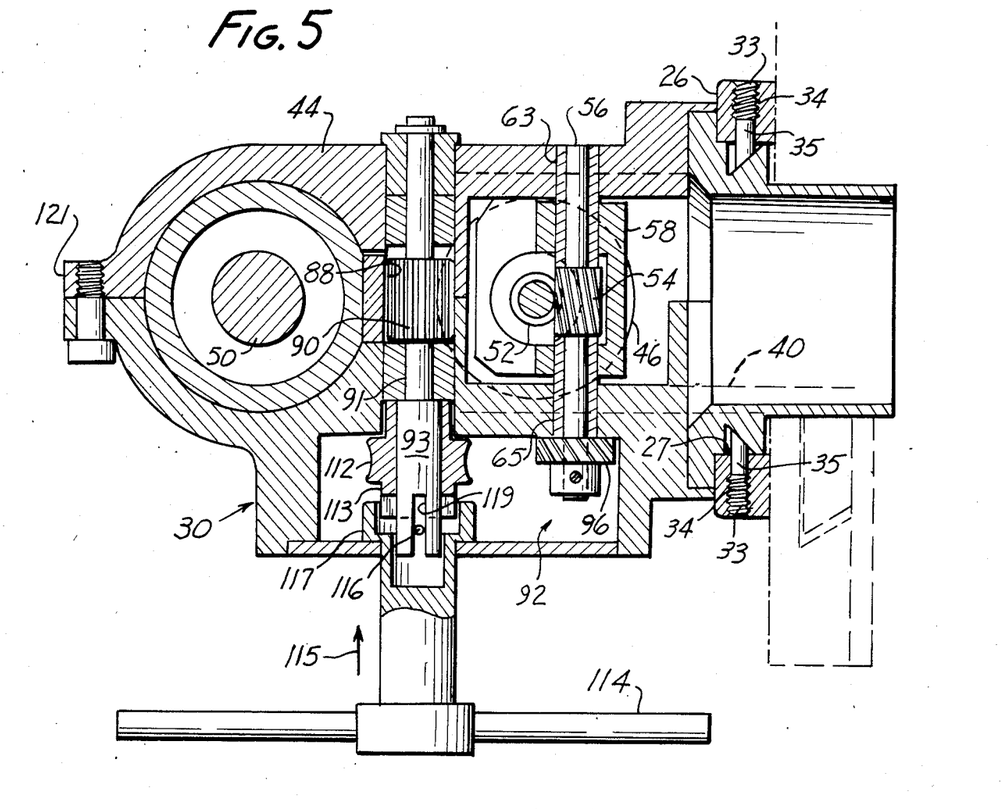
FIG. 5 is a plan sectional view of the head taken on the line 5—5 in FIG. 3.

Reference is now made to FIGS. 3 to 5 for an explanation of the construction and operation of the head 30.

As shown in FIG. 3, the belt 40 enters the head casing 44 through the tubular head mounting shaft 28 and engages an auxiliary shaft drive pulley 46 which is fast with an auxiliary shaft 48. The auxiliary shaft 48 lies vertical and parallel with the tool spindle 50. Above the pulley 46, the shaft 48 is in the form of a worm 52, and the worm is in engagement with a worm gear 54 on a power take-off shaft 56. The worm 52 and power take-off shaft 56 are supported by the lower end 58 of a yoke 60, the upper end 62 of which has a bearing 64 receiving the top end of the auxiliary shaft 48.

As seen in FIG. 3, the machine head 30 has a tubular head mounting shaft 28 extending about the rotational centre or rotational axis 32, and the endless belt 40 extends through that tubular head mounting shaft along that rotational axis and is twistable in that tubular head mounting shaft, as indicated by way of example at 41.

As seen in FIG. 5, the power take-off shaft 56 extends into bearings 63 and 65 in the casing 44 so that in fact the yoke 60 and the shaft 48 can pivot about the axis of the power take-off shaft 56 to a limited degree. Pivoted to the top of the yoke 60 is a cover 66, the pivot point or axis being indicated by 68. At the forward end of the cover 66 to the lower side thereof is provided a jacking pin 70 which, when the cover is in the closed position, is engageable by a tension adjusting screw 72.

Above the lower portion 58 of the yoke 60, is a collar 74 which is engaged by a fork 76 of a quill 80 in which the shaft 50 is contained. The collar 74 is part of a pulley cluster 82 which, via a belt 84, is drivingly connected to pulley cluster 86 on top of the spindle 50. There are three different sized pulleys on the respective clusters 82 and 86, and the belt may be appropriately positioned thereon for any one of three power transmission ratios between the shaft 48 and the spindle 50. It can be seen therefore that drive is transmitted from a motor 36 via the belt 40 to the shaft 48 and via the belt 84 to the spindle 50. When the tension screw 72 is released, and the cover 66 pivoted about pivot point 68, the yoke 60 may be tilted about the axis of power take-off shaft 56 in an anti-clockwise direction, whereby the tension in the belts 84 and 40 is released. These belts may then be relocated and adjusted. Conversely, when the cover 66 is swung to the closed position and the pin 70 is engaged in the casing and acted on by the tension screw 72, the tension in the belt 40 and 84 is increased, and can be further increased by the adjustment of the screw 72.

The utilisation of the auxiliary shaft 48 in this manner, to simulate jacking of drive belts, is in itself a novel concept and can be embodied in transmission systems in general.

The quill 80 is provided with a rack 88 which extends vertically and is engaged by a pinion 90 on a quill drive shaft 91. The quill drive shaft 91 can be driven in any of three manners, and the driving of same is best explained by referring to FIG. 4 which shows in effect a gear box 92 formed in the casing. Referring to FIG. 4, it will be seen that the power take-off shaft 56 is shown, and it lies parallel to the quill feed shaft 93. A transmission shaft 94 lies at right angles to the shafts 56 and 93, and the vertical feed shaft extends out of the casing where it is provided with a vernier adjusting device 95. The power take-off shaft 56 is provided with a helical gear 96 which is engageable with a helical gear 98 on the shaft 94, the gear 98 being movable on the shaft 94 by being splined thereto, and a collar thereof being engaged by a feed fork 100 which is carried by a detent shaft 102 which is displaceable in the gearbox 92 in direction of arrow 104. A spring 106 on the detent shaft 102 urges same to a rearwards position in which the gear 98 is disengaged from gear 96. A detent 108 holds the shaft 102 in a forwards position in which the gear 98 is engaged with gear 96.

Shaft 94 is provided with a worm 110, and the worm is in engagement with a worm wheel 112 which is rotatable relative to the quill feed shaft 93, but can be coupled thereto by a clutch mechanism which is in the form of a pin clutch 113.

The clutch mechanism comprises a handle 114 which is adapted to be pushed inwardly as shown by arrow 115 to a first position in which a pin 116 connected to a clutch actuator 117 on the handle 114 simply engages a slot 119 in the shaft 93. By turning the handle 114, the shafts 91 and 93 thus can be turned independently of the gear wheel 112 in order to turn the drive shaft 91 to raise and to lower the quill 80 and spindle 50 as shown by arrow 118 in FIG. 2. The handle 114 has a second position displaced inwardly in the direction of the arrow 115 from the first position shown in solid lines in FIG. 5. That second position in possible when the slot 119 in the shaft 93 is aligned with either pair of slots 99 in wheel 112. In that second position the clutch actuator 117 drivingly connects the worm wheel 112 with the shaft 93. In this position turning of the vernier mechanism 95 on the end of shaft 94 turns the worm 110 and wheel 112 and effects driving of the quill 80 and spindle 50 to raise and lower same. With the clutch member 114 in this position, the quill can be raised and lowered by power derived from the motor 36 by extracting the detent shaft 102 to the first position by manual shifting of a pin 101 in the direction of arrow 104, in which position the gear wheel 98 engages gear 96. The gears 98 and 96 are designed in relation to the detent holding force such that when the quill reaches a limited position, by reaction, the wheels 98 and 96 will disengage whereby damage to the head will be avoided.

In order to permit the movement of the quill 80 and its shaft 50 between a fully retracted and a fully extended position, the pulley cluster 82 on the auxiliary shaft 48 is carried on the splined portion of that shaft and the cluster 82 can slide up and down thereon, as seen in FIG. 3.

Part of the head 30 may be constructed as a split bushing 121 to permit arrestation of the quill 80 by tightening of a clamping member 122.

The present invention in the described embodiment provides a number of desirable features. Thus, a dual belt drive system provides for rotating and lateral translation of the work spindle 50 with respect to the power source 36. Work piece clamping and manipulation is performed by a conventional base structure table configuration and the resulting overall system is a rigidly mounted table translation system with vertical translation and rotation accomplished through the use of a unique head 30 and transmission system providing flexibility in spindle translation and rotation.

The construction allows the motor 36 to be coupled to, but displaced from, the spindle head by virtue of on the one hand a common mutually coupled vertical slide member, and a flexible coupling belt 40 which allows for rotational drive. The use of the auxiliary shaft assembly 48 allows for spindle and quill travel in a lateral fashion by virtue of the spline drive on the auxiliary shaft assembly, and power take-off through the rotational centre of the auxiliary shaft by virtue of an integral worm drive 52. The tension of the belt and pulley arrangements can be changed by tilting of the auxiliary shaft 48.

Through the series of gears three different feeds can be effected on the spindle and quill, namely coarse feed by hand, fine feed by hand and vernier operation, and power drive. The pivoting of the head cover 66 enables quick release of the tension in the belts 40, and 84 and easy change of gearing between the auxiliary shaft 48 and spindle shaft 50.

According to one aspect of the invention, the illustrated milling machine head assembly comprises, in combination, a milling machine head 30, a movable carriage 22 for mounting that machine head on one side of that carriage 22 for movement with the carriage, an angularly rotatable coupling 26–28 for mounting the machine head on the carriage for angular movement of the machine head 30 relative to the carriage 22 about a predetermined axis of rotation or angular movement 32. A bracket 130 on an opposite side of the carriage mounts the motor 36 on that opposite side of the carriage 22 for movement with that carriage independently of the angular movement of the machine head 30 relative to that carriage 22. The currently considered aspect of the invention provides for transmission of drive power to the machine head 30 in any angular position of that machine head within its angular movement shown, for instance, in FIGS. 2, 6 and 7. According to the illustrated preferred embodiment of the invention, and as indicated at 41 in FIG. 3, the power transmission is twistable relative to the motor 36 and to the axis 32 and extends along that axis through the carriage 22 from the motor 36 or motor pulley 38 to the machine head 30 or pulley cluster 46.

The latter power transmission includes an endless belt such as a toothed timing belt 40, and means for mounting that endless belt in a loop extending through the carriage 22 along, and twistable relative to, the axis 32 or center of rotation of the machine head 30.

The bracket 130 or equivalent means on the carriage 22 maintain the drive motor 36 stationary during angular movement of the machine head 30 about the axis 32.

A slide guide 16 for slidably mounting the carriage 22 is normally mounted in an upright position, whereby the machine head 30 and motor 36 are vertically adjustable and may be clamped in any adjusted position on the slide guide. According to the illustrated perferred embodiment of the invention, the machine head 30 on the carriage 22 includes an angularly rotatable coupling 26–28 whereby the machine head is angularly adjustable about an axis 32 extending at right angles to the vertical direction of movement on the slide guide 16. In contrast to prior-art equipment, the motor 36 does not angularly move with the machine head and does not impose its weight laterally on the machine head.

The milling machine head assembly according to the illustrated embodiment of this invention includes two parallel shafts comprising a spindle shaft 50 for operating a tool bit, and an auxiliary shaft 48 adapted to be driven by the power transmission or belt 40 via one end of the auxiliary shaft. A belt and pulley transmission 82, 84, 86 interconnects another end of the auxiliary shaft 48 with the spindle shaft 50. As seen in FIG. 3, a pivot axis at 56 is located between the first-mentioned belt 40 and the belt and pulley transmission 82, 84, etc. and extends at right angles to the auxiliary shaft 48. The auxiliary shaft 48 is mounted for pivotal movement between the ends thereof about the pivot axis at 56 to permit selective slackening and tightening of the first mentioned belt 40 and of the belt 84 in the belt and pulley transmission and in the power transmission. According to the illustrated embodiment the auxiliary shaft 48 is mounted on a pivotal yoke 60 and a hinge cover assembly 66 is pivotally connected to that yoke for selectively tightening and slackening the belts 40, 84 such as with the aid of pin 70 and tightening screw 72.

A quill surrounds the spindle shaft 50 and has a rack and pinion assembly 88, 90 for moving that quill and spindle shaft along a spindle axis 51. The rack and pinion assembly 88, 90 includes vernier drive 95 and handle drive 114 for moving the quill 80 and spindle shaft 50 by manual adjustment, and a selectively actuable power train 52, 54, 56, 92, 117, 93, 91, 90 for moving said quill and spindle shaft with power from the power transmission 40 or motor 36.

A clutch 117 has a handle 114 for rotating that clutch between first and second positions, with the rack and pinion assembly 88, 90 being driven manually, such as with the handle 114 in the first position of the clutch, and with the rack and pinion assembly being selectively coupled to the power train for moving the quill and spindle shaft 88, 90 with power from the power transmission 40 or motor 36. The handle 114 may be used for coarse adjustment and the vernier drive 95 for manual fine adjustment. In its above mentioned second position, the clutch 117 connects a worm-wheel 112, on the same shaft assembly 91, 93 as the drive pinion, to that drive pinion 90. The worm-wheel 112 is in engagement with a worm 110 on a vernier shaft 94 having vernier controls 95 externally of the head casing, and in the second position of the clutch 117, adjustment of the vernier controls 95 effects fine adjustment of the up and down movement of the quill 80 and spindle shaft 50.

A spring loaded detent shaft 102 is positionable between a first position in which a gear fork 100 on the spring detent shaft moves a helical gear 98 into engagement with a helical gear 96 on the power take-off shaft 56. That helical gear is being positioned by the fork 100 and is splined to the worm 110 which is rotatable by the vernier drive, whereby in a first position of the detent shaft 102 there may be power transmission to the pinion 90 which moves the quill and spindle shaft. When that quill 80 and spindle shaft 50 reach a limiting position, by reaction, the helical gear 98 disengages from helical gear 96 and the detent 108 is released, causing the detent shaft 102 to spring back to the second position illustrated in FIG. 4, whereby the helical gears are disconnected, thereby interrupting the power drive to the spindle and quill.

Figure 7:
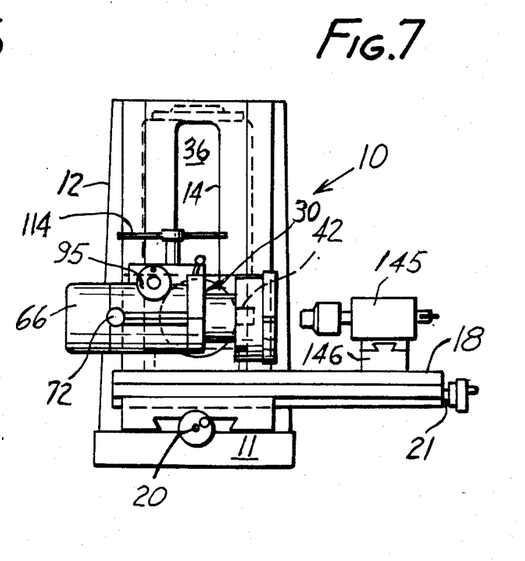
FIG. 7 is a view similar to FIG. 6, illustrating conversion of the machine according to an embodiment of the invention to a lathe.

Whilst FIG. 6 illustrates a certain angular movement of the machine head 30, FIG. 7 shows an extreme or horizontal angular position of the machine head, in which the equipment may be used as a lathe. As an important point of the illustrated preferred embodiment of the invention, the drive motor 36 remains upright irrespective of any angular position of the machine head 30.

An auxiliary chuck 144 or other accessory is disposed on a holder 145 which is mounted on the worktable 18, if necessary on an X-Y adjustable support 146 of its own. The machine head 30, with rotatable spindle 42 may perform the function of a lathe headstock, with appropriate chuck or turntable 147, as desired. As customary with lathes, various tool holders, including those shown at 144 and 145, may be disposed on and slidable relative to the table 18 for performing numerous lathe operations.

Various modifications and variations within the spirit and scope of the subject invention will become apparent or suggest themselves to those skilled in the art.

I claim:

1. A milling machine head assembly, comprising in combination:
   a milling machine head;
   means including a movable carriage for mounting said machine head for movement with said carriage;
   means for mounting said machine head on one side of said carriage for angular movement of said machine head relative to said carriage about a predetermined axis, said means for mounting said machine head include a slide guide for slidably mounting said carriage, and means for mounting said slide guide in an upright position, whereby said machine head and motor are vertically adjustable, and means for clamping the machine head in any adjusted position on the slide guide;
   means on an opposite side of said carriage for mounting a motor on said opposite side of the carriage for movement with said carriage independently of said angular movement of the machine head relative to said carriage;
   means for transmitting drive power to the machine head in any angular position of said machine head within said angular movement, including a power transmission twistable relative to the motor and to said predetermined axis and extending along said predetermined axis through said carriage from said motor on said opposite side of the carriage to the machine head on said one side of the carriage, said power transmission includes an endless belt and means for mounting said endless belt in a loop extending through said carriage from said opposite side to said one side of the carriage along, and twistable relative to, said predetermined axis.

2. A milling machine head assembly as in claim 1, wherein:
   said machine head has a tubular head mounting shaft extending about said predetermined axis; and
   said endless belt extends through said tubular head mounting shaft along said predetermined axis and is twistable in said tubular head mounting shaft.

3. A milling machine head assembly as in claim 1, including:
   means on said carriage for maintaining said motor stationary during angular movement of said machine head.

4. A milling machine head assembly as in claim 1, wherein:
   said means for mounting said machine head on said carriage include an angularly rotatable coupling whereby the machine head is angularly adjustable about said predetermined axis.

5. A milling machine head assembly as in claim 4, including:
   further clamping means for clamping the machine head in any angularly adjusted position.

6. A milling machine head assembly, comprising in combination:
   a milling machine head;
   means including a movable carriage for mounting said machine head for movement with said carriage;
   means for mounting said machine head on said carriage for angular movement of said machine head relative to said carriage about a predetermined axis;
   means on said carriage for mounting a motor for movement with said carriage;
   two parallel shafts comprising a spindle shaft for operating a tool bit, and an auxiliary shaft;
   means for transmitting drive power to the machine head in any angular position of said machine head within said angular movement, including a power transmission twistable relative to said predetermined axis and extending along said predetermined axis through said carriage from said motor to the machine head, said power transmission includes an endless belt and means for mounting said endless belt in a loop extending through said carriage along, and twistable relative to, said predetermined axis, and said auxiliary shaft being adapted to be driven by said endless belt via one end of the auxiliary shaft;

a belt and pulley transmission interconnecting another end of the auxiliary shaft with said spindle shaft;

a pivot axis located between said endless belt and said belt and pulley transmission and extending at right angles to said auxiliary shaft; and means for mounting said auxiliary shaft for pivotal movement about said pivot axis between the ends thereof to permit selective slackening and tightening of belt means in said belt and pulley transmission and of said endless belt in said power transmission.

7. A milling machine head assembly as in claim 6, wherein:

said belt and pulley transmission comprises respective pulley clusters on the spindle shaft and auxiliary shaft, the respective pulleys of the clusters being of different diameter, whereby the gear ratio between the shafts can be adjusted by repositioning belt means so as to pass around different ones of the pulleys of the pulley clusters.

8. A milling machine head assembly as in claim 6, wherein:

said means for mounting the auxiliary shaft include a pivotal yoke, and a hinge cover assembly pivotally connected to the yoke for selectively tightening and slackening said belt means.

9. A milling machine head assembly as in claim 6, including:

a quill surrounding the spindle shaft and having a rack and pinion assembly for moving said quill and spindle shaft along a spindle axis.

10. A milling machine head assembly as in claim 9, wherein:

said transmission comprises a first pulley cluster on said spindle shaft, a second pulley cluster splined on said auxiliary shaft for movement therealong for change of gear ratio, and belt means interconnecting said first and second pulley clusters.

11. A milling machine head assembly as in claim 9, including:

first means in said rack and pinion assembly for moving said quill and spindle shaft by manual adjustment; and second means in said rack and pinion assembly for moving said quill and spindle shaft with power from said power transmission.

12. A milling machine head assembly, comprising in combination:

two parallel shafts comprising a spindle shaft for operating a tool bit, and an auxiliary shaft adapted to be driven off a motor by a first belt via one end of the auxiliary shaft;

a belt and pulley transmission interconnecting another end of the auxiliary shaft with said spindle shaft;

a pivot axis located between said first belt and said belt and pulley transmission and extending at right angles to said auxiliary shaft;

means for mounting said auxiliary shaft for pivotal movement between the ends thereof about said pivot axis to permit selective slackening and tightening of said first belt and of belt means in the belt and pulley transmission.

13. A milling machine head assembly as in claim 12, wherein:

said transmission comprises respective pulley clusters on the spindle shaft and auxiliary shaft, the respective pulleys of the clusters being of different diameter, whereby the gear ratio between the shafts can be adjusted by repositioning belt means so as to pass round different ones of the pulleys of the pulley clusters.

14. A milling machine head assembly as in claim 12, wherein:

said means for mounting the auxiliary shaft include a pivotal yoke pivoted on said pivot axis, and a hinge cover assembly pivotally connected to the yoke for selectively tightening and slackening said belt means.

15. A milling machine head assembly as in claim 12, including:

a quill surrounding the spindle shaft and having a rack and pinion assembly for moving said quill and spindle shaft along a spindle axis.

16. A milling machine head assembly as in claim 12, wherein:

said transmission comprises a first pulley cluster on said spindle shaft, a second pulley cluster splined on said auxiliary shaft for movement therealong for change of gear ratio, and belt means interconnecting said first and second pulley clusters.

17. A milling machine head assembly as in claim 12, including:

first means in said rack and pinion assembly for moving said quill and spindle shaft by manual adjustment; and second means in said rack and pinion assembly for moving said quill and spindle shaft with power from said power transmission.

18. A milling machine head assembly as in claim 17, wherein:

said first means include a clutch having a handle for rotating said clutch and for actuating said clutch between first and second positions, and means for driving said rack and pinion assembly manually with said handle in said first position of the clutch and for selectively coupling said rack and pinion assembly to said second means for moving said quill and spindle shaft with power from said power transmission.

* * * * *